(12) United States Patent
Bartels

(10) Patent No.: US 6,513,871 B2
(45) Date of Patent: Feb. 4, 2003

(54) HEADREST ON A VEHICLE SEAT

(75) Inventor: Sven Bartels, Genthin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/775,797

(22) Filed: Feb. 5, 2001

(65) Prior Publication Data

US 2001/0026090 A1 Oct. 4, 2001

(30) Foreign Application Priority Data

Feb. 5, 2000 (DE) .......................... 100 05 196

(51) Int. Cl.⁷ ................................................. B60N 2/48
(52) U.S. Cl. .................................. 297/216.12; 297/406
(58) Field of Search ........................... 297/216.12, 391, 297/407, 406

(56) References Cited

U.S. PATENT DOCUMENTS

| | | | | |
|---|---|---|---|---|
| 4,883,243 A | * | 11/1989 | Herndon | ................ 297/216.12 |
| 5,752,742 A | * | 5/1998 | Kerner et al. | ............... 297/406 |
| 6,120,099 A | * | 9/2000 | Reikeras et al. | ............. 297/406 |
| 6,220,668 B1 | * | 4/2001 | Scheffzuck | ............. 297/391 X |

FOREIGN PATENT DOCUMENTS

DE      196 02 909      7/1997

* cited by examiner

Primary Examiner—Anthony D. Barefield
(74) Attorney, Agent, or Firm—Crowell & Moring LLP

(57) ABSTRACT

On a vertically adjustable headrest provided on a backrest of a vehicle seat, a perpendicularly extending center part is arranged on a front side. On the two lateral edges of the center part, a supporting part is pivotally connected in each case by way of a film hinge, which supporting parts can be swivelled toward lateral edges of the headrest. A holding bow is provided on each supporting part. A leg spring, which itself is inserted into the headrest, reaches around the holding bow. The holding bow interacts with the leg spring such that, in the event of a vehicle crash, the supporting parts are displaced into the inoperative position by the mere action of the vehicle occupant's head. Furthermore, one control element respectively can also be applied to the end section of the supporting part, by way of which control element, the supporting part is swivelled in a sensor-controlled manner into the inoperative position in the event of a vehicle crash.

21 Claims, 2 Drawing Sheets

HEADREST ON A VEHICLE SEAT

BACKGROUND AND SUMMARY OF THE INVENTION

This application claims the priority of German Patent Application 100 05 196.0, filed in Germany, Feb. 5, 2000, the disclosure of which is expressly incorporated by reference herein.

The invention relates to a headrest on a vehicle seat having two lateral supporting parts which can be displaced between an inoperative position and a tilted-out position and which, in the inoperative position, extend approximately in a transverse vehicle plane, while, in the tilted-out position, they enclose, together with a longitudinal vehicle plane, an acute angle which is open toward a front side of a vehicle. German Patent Document DE 196 02 909 A1, (FIG. 7), is an example of this type of headrest.

As indicated in the description of FIG. 7 of the German Patent De 196 02 909 A1 and illustrated in the drawing, in the center area of its width dimension, the vehicle seat is provided with a headrest which has two lateral supporting parts. These can each be swivelled about a vertical longitudinal center plane of the vehicle seat such that they extend either approximately in a transverse vehicle plane or enclose a more or less large angle, the two supporting parts being locked in the selected swivelling positions by a locking device.

By means of the supporting parts, which extend diagonally with respect to a transverse vehicle plane, the vehicle occupant's head is to be protected from high lateral accelerations which may occur in a vehicle crash. However, during the crash, the vehicle occupant's head is usually displaced for a short time away from the headrest and is then thrown back against it. Since, in most cases, the vehicle occupant's head does not impact onto the center of the headrest but laterally onto it and therefore strikes against its diagonally extending supporting parts, the head is additionally thrown toward the left or toward the right, specifically as a result of the diagonal position of the supporting parts, so that the locking of the supporting parts of the headrest do not ensure an optimal protection against injury.

It is therefore an object of the invention to construct a headrest of the type indicated above such that the risk of injury to the vehicle occupant will not be increased in the event of a vehicle crash, when at least one of the supporting parts is in the tilted-out position and the lateral area of the headrest is acted upon by the vehicle occupant's head.

For achieving the object, the headrest is characterized in that the two supporting parts are connected such with the headrest that, in the event of a vehicle crash, they are automatically displaced by one of a mere action of the vehicle occupant's head and a control element into the inoperative position.

According to the invention, the supporting parts are connected with the headrest carrying them by means of such a device that, in the event of a vehicle crash, they are displaced in the inoperative position by a mere action of the head or by an adjusting element so that, by means of the existing supporting parts, the vehicle occupant's head is not additionally laterally displaced and there will be no additional risk of injury. However, the holding device of the supporting parts is nevertheless constructed such that it can absorb the acceleration forces which normally occur in the driving operation. As a result, the headrest provided with the supporting parts ensures an optimal protective function in the normal driving operation as well as in the event of a vehicle crash. In this case, the device of the supporting parts according to the invention has a low weight and can be provided in a very simple and cost-effective manner.

The two supporting parts are expediently hinged to the center area of the width dimension of the headrest and, when acted upon by the vehicle occupant or by an adjusting element, are displaced toward the lateral edge of the headrest.

A very simple device, which can be produced at reasonable cost, consists of a curved holding bow which is pivotally connected to the free end section of the supporting parts or is rigidly mounted on an interior upholstery plate and which, on its free end section which can be displaced into the headrest, has several detent grooves which are arranged at a distance from one another and into which a leg spring or similar detent element also provided in the headrest engages in a locking manner in the respective pivoting position of the receiving part. In this case, the spring effect of the leg spring which acts upon the holding bow is coordinated such that, in the case of the lateral acceleration forces customary in the driving operation, the supporting parts remain in the tilt-out position, while, in the event of a vehicle crash, they are displaced into the inoperative position by the mere action of the vehicle occupant's head.

It is also contemplated in certain embodiments of the invention, that in each case, by means of a mechanically or electrically/electronically actuated control element, the supporting part is swivelled in a sensor-controlled manner into the inoperative position in the event of a vehicle crash.

A special further development of a vertically displaceable headrest according to certain preferred embodiments of the invention consists of the fact that it has a front-side recess for the arrangement of the two supporting parts, in the center area of the width dimension of the headrest, a stationary, perpendicularly extending center part being provided which is in each case adjoined by a lateral supporting part which is pivotally connected by way of a film hinge, while the upper, free end section of the headrest, in an approximately surface-flush manner, adjoins the center part and the supporting parts situated in the inoperative position. As a result, a vertically displaceable headrest is created which has an optimal design with respect to its appearance.

Other objects, advantages and novel features of the present invention will become apparent from the following detailed description of the invention when considered in conjunction with the accompanying drawings.

DETAILED DESCRIPTION OF THE DRAWINGS

Figure 1:
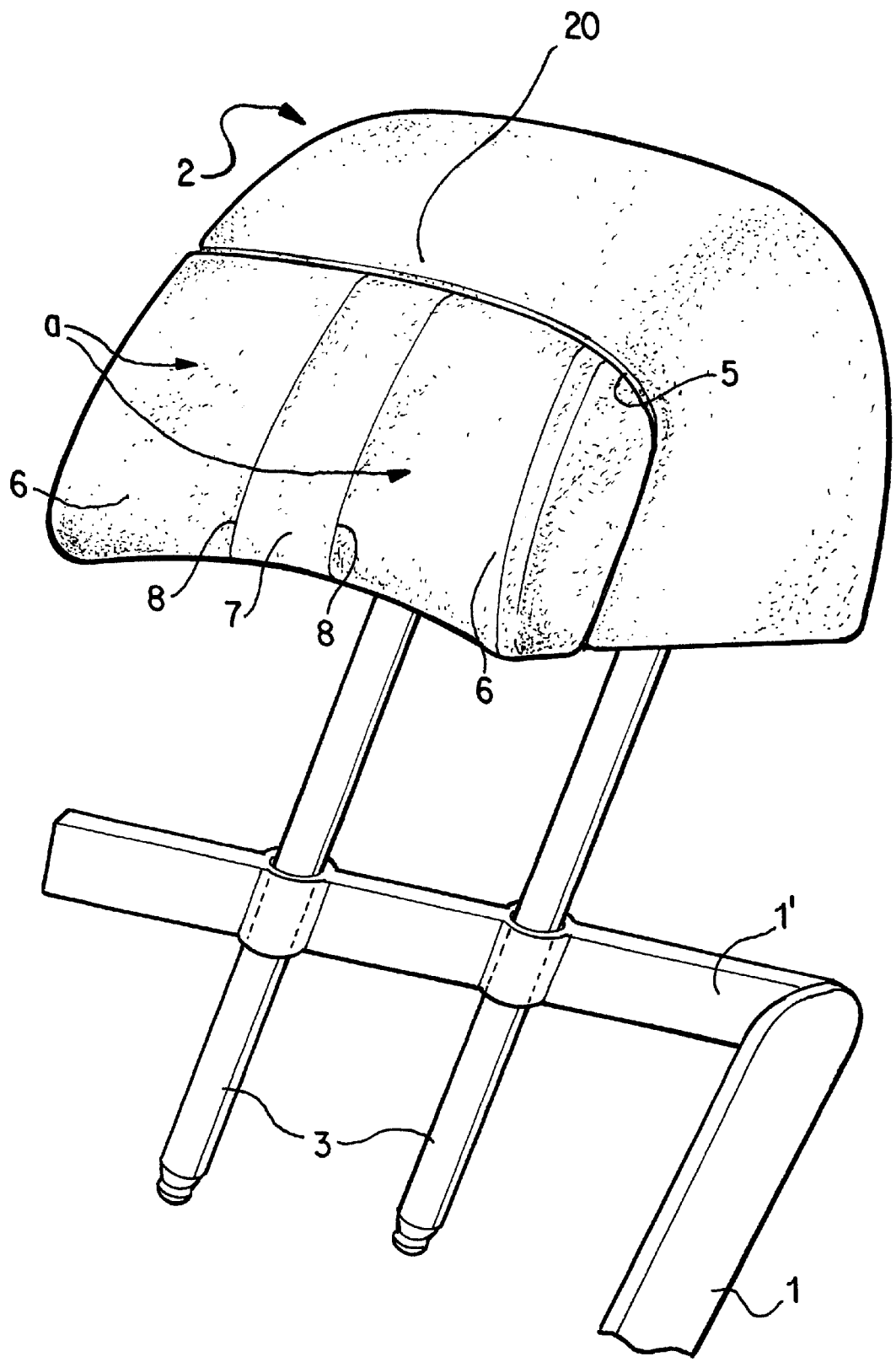
FIG. 1 is a perspective representation of the upper end area of a backrest of a vehicle seat with a headrest constructed according to a preferred embodiment of the present invention, whose supporting parts are shown in the inoperative position.

FIG. 1 illustrates the backrest 1 of a vehicle seat which is not shown in detail, on the upper transverse frame part 1' of the backrest 1, a headrest 2 being provided which is vertically adjustable by means of two carrying rods 3.

Figure 2:
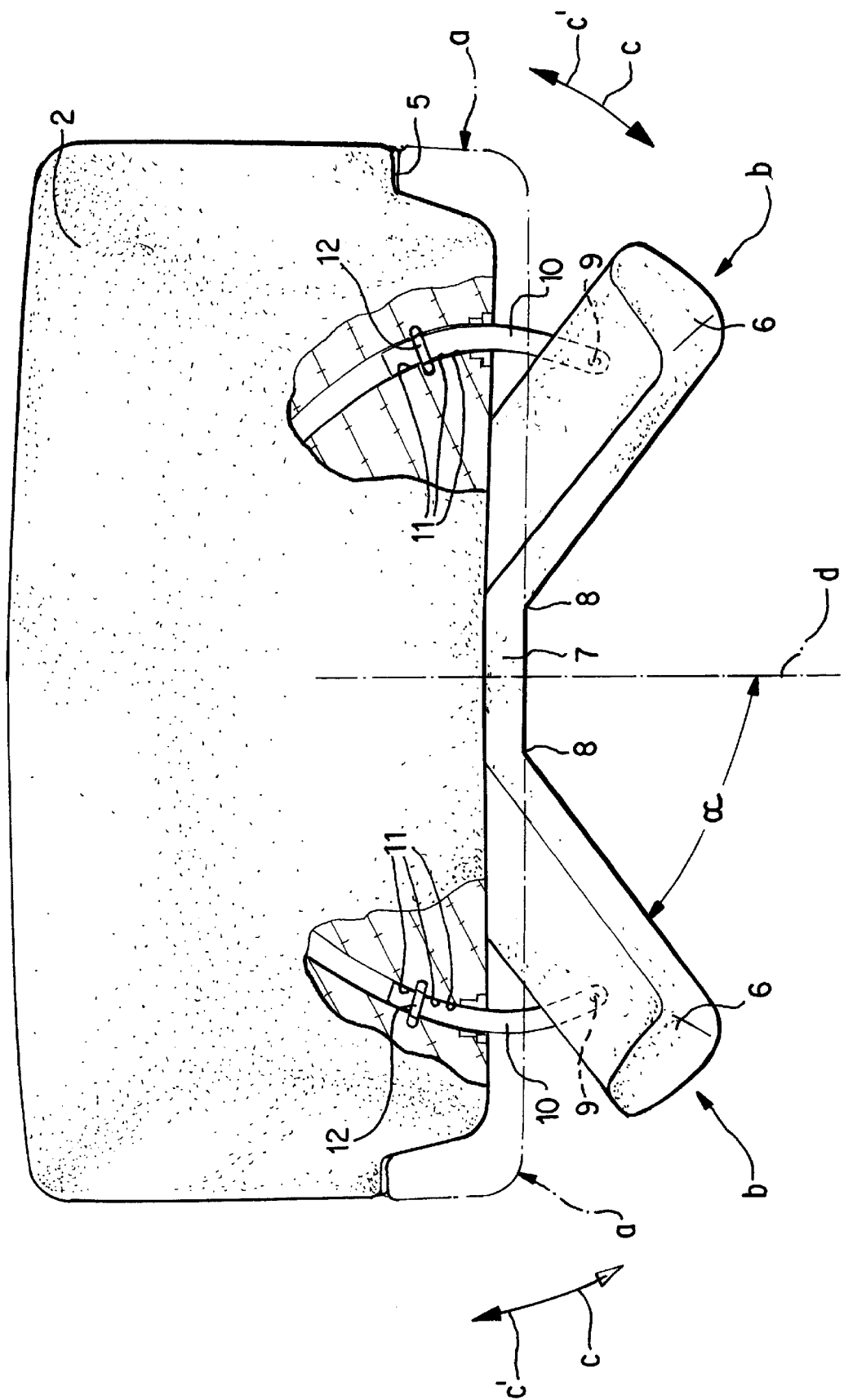
FIG. 2 is a top view with respect to FIG. 1, shown with the supporting parts displaced into the tilt-out position.

As illustrated in FIGS. 1 and 2, the headrest 2 has a front-side recess 5 which extends toward its lower edge and which is used for arranging two supporting parts 6 at the inoperative position a. Furthermore, a stationary, perpendicularly extending center part 7 is provided in the center area of the width dimension of the headrest 2, to which center part 7, laterally by way of a perpendicularly extending film hinge 8, one supporting part 6 respectively is pivotally connected which is disposed to be swivellable in the direction of the double arrow c. In this case, the film hinges 8 are constructed on a part covered by the outer covering of the headrest 2 and consisting of plastic, leather or the like, or on an interior upholstery plate.

As illustrated in FIG. 2, a curved holding bow 10 is pivotally connected to the free end section of the two supporting parts 6, in each case, by way of a bearing bolt 9. On its free end section, the holding bow 10 has several detent grooves 11 which are arranged at a distance from one another. In this case, the holding bows 10 can also be rigidly mounted on an interior upholstery plate. In addition, an approximately U-shaped leg spring 12 is provided in the headrest 2 in each case in the area of the holding bow 10, the two legs of the leg spring surrounding the holding bow 10. In this case, the leg spring 12 locks elastically into a detent groove 11 in the tilted-out position b illustrated in FIG. 2, the spring force of the leg springs 12 being coordinated such that the supporting parts 6 in their tilted-out position b withstand the lateral acceleration forces normally occurring in the driving operation, as a result of which forces the supporting parts 6 are loaded by the vehicle occupant's head. However, in the event of a vehicle crash, the vehicle occupant's head may be thrown so severely at least against one of the supporting parts 6 that this supporting part, as a result of the impact energy, is automatically swivelled in the direction of the arrow c' into the inoperative position a. In this case, the supporting parts 6, in the inoperative position a, extend approximately in a transverse plane of the vehicle (illustrated in FIG. 1 by drawn-out lines and in FIG. 2, by dash-dotted lines), while, in the tilted-out position b, they enclose, together with the longitudinal plane of the vehicle, an acute angle a which is open toward the front side of the vehicle.

The present invention also contemplates embodiments including a mechanically, electrically or electronically actuated control element E, provided in the headrest 2 in the area of one supporting part 6 respectively, by means of which control element the supporting part 6 is displaced from the tilted-out position b into the inoperative position a in a sensor controlled manner by a control unit CU in the event of a vehicle crash. The control element E and control unit CU, operable in response to crash condition sensor S, are schematically depicted in dash lines in FIG. 2.

As illustrated in FIG. 1, the upper free end section 20 of the headrest 2 adjoins the center part 7 and the supporting parts 6 situated in the inoperative position a in an approximately surface-flush manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Headrest on a vehicle seat having two lateral supporting parts which can be displaced between an inoperative position and a tilted-out position and which, in the inoperative position, extend approximately in a transverse vehicle plane, while, in the tilted-out position, they enclose, together with a longitudinal vehicle plane, an acute angle which is open toward a front side of a vehicle, wherein the two supporting parts are connected such with the headrest that, in the event of a vehicle crash, they are automatically displaced by one of a mere action of the vehicle occupant's head and a control element into the inoperative position.

2. Headrest according to claim 1, wherein the two supporting parts are pivotally connected to a center area of the width dimension of the headrest and are displaced into the inoperative position from the tilted-out position by moving the two supporting parts in a direction toward a lateral edge of the headrest.

3. Headrest according to claim 2, wherein one curved holding bow respectively is pivotally connected to a free end section of the supporting parts or is rigidly mounted on an upholstery plate, which holding bow has on its free end section several mutually spaced detent grooves into which a detent element engages in a locking manner which is situated in the headrest.

4. Headrest according to claim 3, wherein in the headrest, in the area of its lateral edges, one leg spring respectively is provided which surrounds the holding bow and which, in a respective swivelling position of the supporting part, elastically locks into a detent groove of the holding bow.

5. Headrest according to claim 2, wherein one mechanically, electrically or electronically actuated control element respectively is applied to the free end section of the supporting part, by means of which control element the supporting part is swivelled in a sensor-controlled manner in the event of a vehicle crash from the tilted-out position into the inoperative position.

6. Headrest according to claim 2, wherein the two supporting parts are situated in a front-side recess of the headrest, wherein in the center area of the width dimension of the headrest, a stationary, perpendicularly extending center part is provided which is laterally adjoined by one supporting part respectively which is pivotally connected to a film hinge of the headrest, and wherein an upper free end section of the headrest, in an approximately surface-flush manner, adjoins the center part and the supporting parts situated in the inoperative position.

7. A vehicle headrest assembly comprising:

a central headrest part, a pair of lateral headrest support parts disposed at respective lateral sides of the central headrest part, a lateral headrest support holding structure operable to hold the lateral headrest support parts between a tilted out operative position for normal driving and an inoperative position, wherein in the tilted out position the support parts enclose, together with a longitudinal vehicle plane, an acute angle which is open toward a front side of the vehicle, and wherein in the inoperative position the support parts extend approximately in a transverse vehicle plane, and control means automatically operable to move the support parts from the operative to the inoperative position in response to an event of a vehicle crash.

8. A vehicle headrest assembly according to claim 7, wherein the lateral headrest support holding structure includes a holding bow which is movably disposed at a headrest frame.

9. A vehicle headrest assembly according to claim 8, wherein the control means includes spring loaded latching means engageable with said holding bow.

10. A vehicle headrest assembly according to claim 8, wherein the control means includes a mechanically actuated control element engageable with said holding bow and operable in response to a collision sensor signal.

11. A vehicle headrest assembly according to claim 8, wherein the control means includes an electrically actuated control element engageable with said holding bow and operable in response to a collision sensor signal.

12. A vehicle headrest assembly according to claim 8, wherein the control means includes an electronically actuated control element engageable with said holding bow and operable in response to a collision sensor signal.

13. A method of adjusting a headrest of a vehicle, the headrest having two lateral supporting parts which can be displaced between an inoperative position and a tilted-out position and which, in the inoperative position, extend approximately in a transverse vehicle plane, while, in the tilted-out position, they enclose, together with a longitudinal vehicle plane, an acute angle which is open toward a front side of a vehicle, comprising:

automatically displacing the two supporting parts from the tilted-out position to the inoperative position in the event of a vehicle crash by one of a mere action of the vehicle occupant's head and a control element.

14. The method of claim 13 wherein said step of automatically displacing the two supporting parts includes the step of mechanically actuating a control element in response to a collision sensor signal.

15. The method of claim 13 wherein said step of automatically displacing the two supporting parts includes the step of electrically actuating a control element in response to a collision sensor signal.

16. The method of claim 13 wherein said step of automatically displacing the two supporting parts includes the step of electronically actuating a control element in response to a collision sensor signal.

17. A vehicle headrest assembly comprising:

a central headrest part, a pair of lateral headrest support parts disposed at respective lateral sides of the central headrest part, a lateral headrest support holding structure operable to hold the lateral headrest support parts between a tilted out operative position for normal driving and an inoperative position, wherein in the tilted out position the support parts enclose, together with a longitudinal vehicle plane, an acute angle which is open toward a front side of the vehicle, and wherein in the inoperative position the support parts extend approximately in a transverse vehicle plane, and control means operable to move the support parts from the operative to the inoperative position in an event of a vehicle impending crash condition, wherein the lateral headrest support holding structure includes a holding bow which is movably disposed at a headrest frame.

18. A vehicle headrest assembly according to claim 17, wherein the control means includes spring loaded latching means engageable with said holding bow.

19. A vehicle headrest assembly according to claim 17, wherein the control means includes a mechanically actuated control element engageable with said holding bow and operable in response to a collision sensor signal.

20. A vehicle headrest assembly according to claim 17, wherein the control means includes an electrically actuated control element engageable with said holding bow and operable in response to a collision sensor signal.

21. A vehicle headrest assembly according to claim 17, wherein the control means includes an electronically actuated control element engageable with said holding bow and operable in response to a collision sensor signal.

* * * * *